United States Patent
Fujita et al.

(10) Patent No.: US 11,851,254 B2
(45) Date of Patent: Dec. 26, 2023

(54) SYSTEM FOR CLOSING PACKAGING AND SYSTEM FOR AUTHENTICATING PACKAGING COMPRISING A FRANGIBLE RADIOFREQUENCY IDENTIFICATION TAG

(71) Applicant: Máquinas Agrícolas Jacto S.A.-Divisão Unipac, Pompéia-SP (BR)

(72) Inventors: Humberto Fujita, Marília SP (BR); Reinaldo de Bernardi, Sorocaba SP (BR)

(73) Assignee: MÁQUINAS AGRÍCOLAS JACTO S.A.-DIVISÃO UNIPAC, Pompéia-SP (BR)

( * ) Notice: Subject to any disclaimer, the term of this patent is extended or adjusted under 35 U.S.C. 154(b) by 611 days.

(21) Appl. No.: 16/977,182

(22) PCT Filed: Mar. 8, 2019

(86) PCT No.: PCT/BR2019/000007
§ 371 (c)(1),
(2) Date: Sep. 1, 2020

(87) PCT Pub. No.: WO2019/178656
PCT Pub. Date: Sep. 26, 2019

(65) Prior Publication Data
US 2021/0002047 A1    Jan. 7, 2021

(30) Foreign Application Priority Data
Mar. 21, 2018    (BR) .......................... 1020180056271

(51) Int. Cl.
*B65D 51/24*    (2006.01)
*B65D 41/04*    (2006.01)
(Continued)

(52) U.S. Cl.
CPC ......... *B65D 51/245* (2013.01); *B65D 41/045* (2013.01); *B65D 41/38* (2013.01);
(Continued)

(58) Field of Classification Search
CPC ....... G06K 19/07726; G06K 19/07798; B65D 2203/10
(Continued)

(56) References Cited

U.S. PATENT DOCUMENTS 7,388,506 B2    6/2008    Abbott
7,782,212 B2 *  8/2010    Burns ................ G06K 19/0723
                                                                340/10.5

(Continued)

FOREIGN PATENT DOCUMENTS

BR    PI0707510 A2        5/2011
BR    102017016344-0 A    3/2019
(Continued)

OTHER PUBLICATIONS

International Search Report of PCT/BR2019/000007, dated May 22, 2019.

*Primary Examiner* — Suezu Ellis
(74) *Attorney, Agent, or Firm* — Collard & Roe, P.C.

(57) ABSTRACT

A package closure system has a frangible radiofrequency identification label which is protected from the external environment by a cover and the frangible label is damaged preventing its normal operation when the package cover is removed. More specifically, a package closure system has a cover, a metallic induction seal attached to the package nozzle and a frangible radiofrequency identification label in which the frangible radiofrequency identification label is attached directly or indirectly to one of its parts on the inner portion of the cover and on another part on the outer portion of the metallic seal.

5 Claims, 9 Drawing Sheets

(51) Int. Cl.
*B65D 41/38* (2006.01)
*B65D 53/04* (2006.01)
*G06K 19/077* (2006.01)
*G06K 19/04* (2006.01)

(52) U.S. Cl.
CPC ........... *B65D 53/04* (2013.01); *G06K 19/041* (2013.01); *G06K 19/07726* (2013.01); *G06K 19/07798* (2013.01); *B65D 2203/10* (2013.01)

(58) Field of Classification Search
USPC ............................ 235/492; 340/572.1, 572.8
See application file for complete search history.

(56) References Cited

U.S. PATENT DOCUMENTS

| | | | |
|---|---|---|---|
| 8,097,199 | B2 | 1/2012 | Abbott et al. |
| 2002/0185544 | A1* | 12/2002 | Baillod ................ G06K 19/073 235/494 |
| 2006/0049948 | A1* | 3/2006 | Chen .................... G06K 19/073 235/492 |
| 2007/0182563 | A1* | 8/2007 | Abbott ................. B65D 41/045 340/572.8 |
| 2007/0182564 | A1* | 8/2007 | Abbott ................. B65D 41/045 340/572.8 |
| 2008/0149584 | A1 | 6/2008 | Martinelli |
| 2008/0309495 | A1 | 12/2008 | Chisholm |
| 2011/0253715 | A1* | 10/2011 | Phaneuf ................. B65D 53/04 156/69 |
| 2015/0186770 | A1 | 7/2015 | Arai et al. |
| 2016/0101019 | A1 | 4/2016 | McDowell |

FOREIGN PATENT DOCUMENTS

| | | |
|---|---|---|
| CN | 202615431 U | 12/2019 |
| EP | 3 184 456 A1 | 6/2017 |
| WO | 2019018915 A1 | 1/2019 |

\* cited by examiner

SYSTEM FOR CLOSING PACKAGING AND SYSTEM FOR AUTHENTICATING PACKAGING COMPRISING A FRANGIBLE RADIOFREQUENCY IDENTIFICATION TAG

CROSS REFERENCE TO RELATED APPLICATIONS

This application is the National Stage of PCT/BR2019/000007 filed on Mar. 8, 2019, which claims priority under 35 U.S.C. § 119 of Brazilian Application No. 1020180056271 filed on Mar. 21, 2018, the disclosure of which is incorporated by reference. The international application under PCT article 21(2) was not published in English.

FIELD OF INVENTION

This invention belongs to the field of package closing system and package authentication system comprising frangible radiofrequency identification labels.

BACKGROUND OF INVENTION

Package closing system and package authentication system comprising FRANGIBLE RADIOFREQUENCY IDENTIFICATION LABELS are known in the state of the art.

It is common to use systems where frangible radiofrequency identification labels are attached to the outer portion of the cover and the outer portion of the package, so that when the cover is opened the label breaks. However, such systems have the inconvenience of, for example, the possibility of accidental label breakage.

Solutions to the problem of accidental breakage of radiofrequency identification labels are, for example, its attachment to the inner portion of the cover or its incorporation into sealing seals to be attached to the package nozzle, so that they are protected from external exposure, such as the systems described in publications US 2011/0253,715A1 and U.S. Pat. No. 7,388,506B2. These solutions have as disadvantage the fact that the Radiofrequency identification labels are not destroyed when opening the packaging and thus facilitate their possible misuse.

This invention solves the problems found in the current state of the art, by providing an innovative package closing system comprising a frangible type radiofrequency identification label that is protected from the external environment of the package and that is destroyed when the package is opened.

BRIEF DESCRIPTION OF FIGURES

The FIG. 1 illustrates a possible construction of this invention, in which the package body (1) with the closing system, comprised by the cover (4), seal (3) attached to the package nozzle (2) and "frangible" type radiofrequency identification label (6), where the "frangible" type radiofrequency identification label (6) is attached directly to the inner portion of the cover (4i) at one end and the other end to the outer portion of the seal (3e). In this figure, the space between the outer surface of the seal (3e) and the inner portion of the cover (4i) has been deliberately represented with a large space to make easy the visualization of how the "frangible" type radiofrequency identification label (6) is attached to the cover (4) and seal (3).

The FIG. 2 illustrates the inner portion of the cover (4i), formed by a side wall (4p) of generally cylindrical shape and a top surface (4t), perpendicular to the axis of the side wall (4p).

Figure 1:
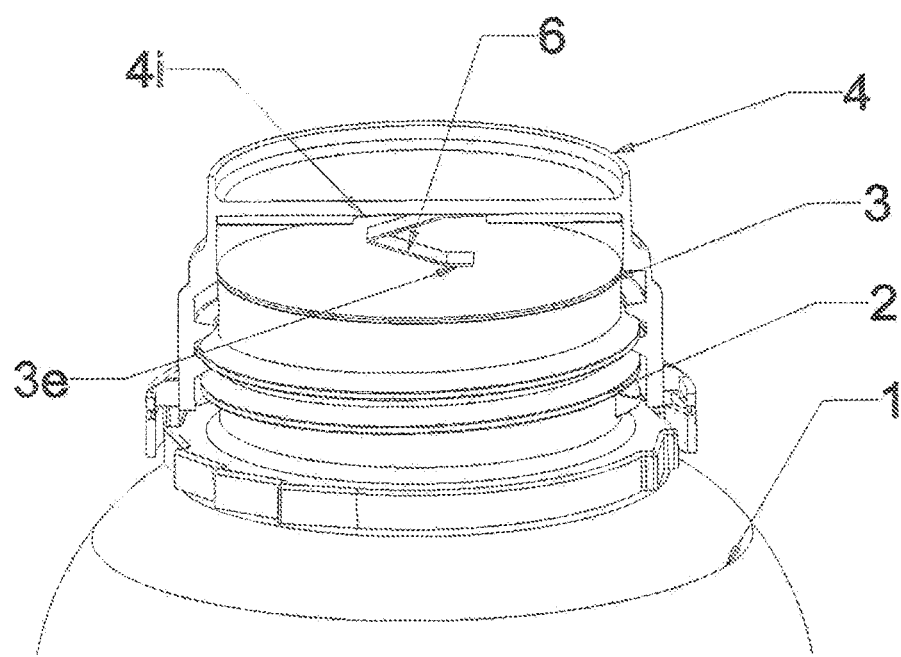
Figure 2:
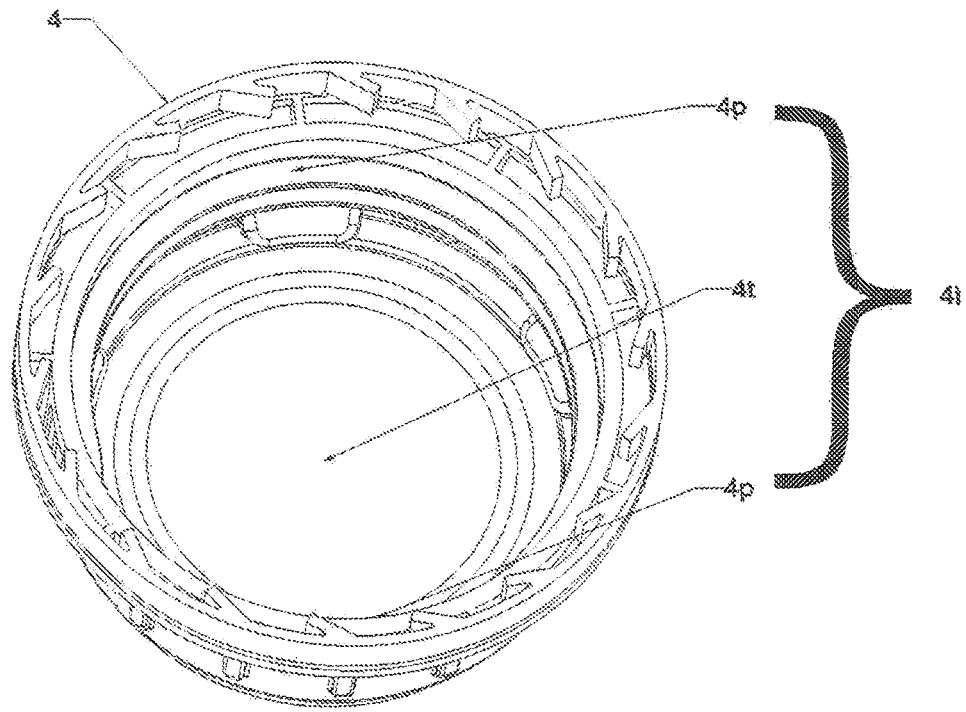
Figure 3:
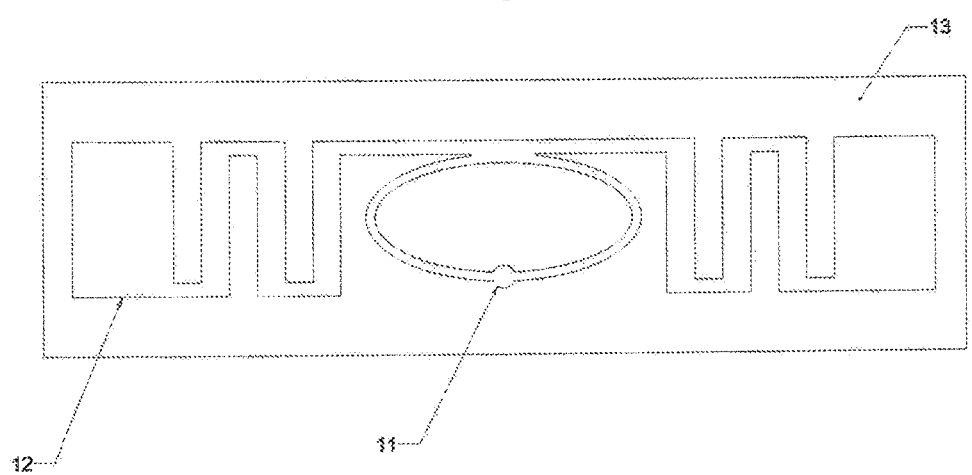

The FIG. 3 illustrates a label with frangible radiofrequency identification feature (6), consisting of microprocessor (11), antenna (12) and substrate (13).

Figure 4:
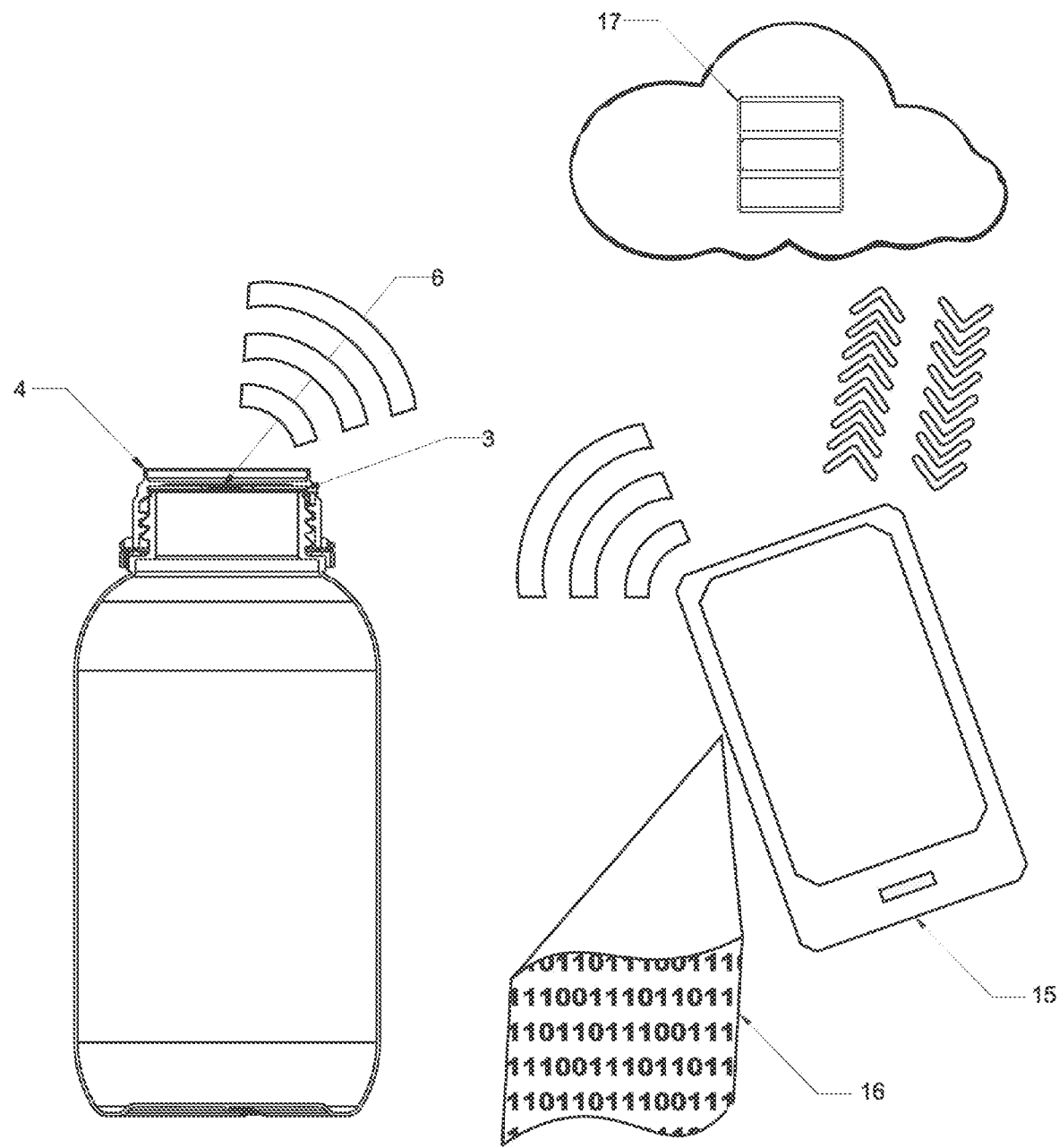

The FIG. 4 illustrates the operation of the package authentication system, where a label with "frangible" radiofrequency identification feature (6) is attached between the cover (4) and the seal (3). A reading device (15) reads the label's information with "frangible" radiofrequency identification feature (6) and the system for verifying read information (16) accesses a database (17) to verify if the item is authentic.

Figure 5:
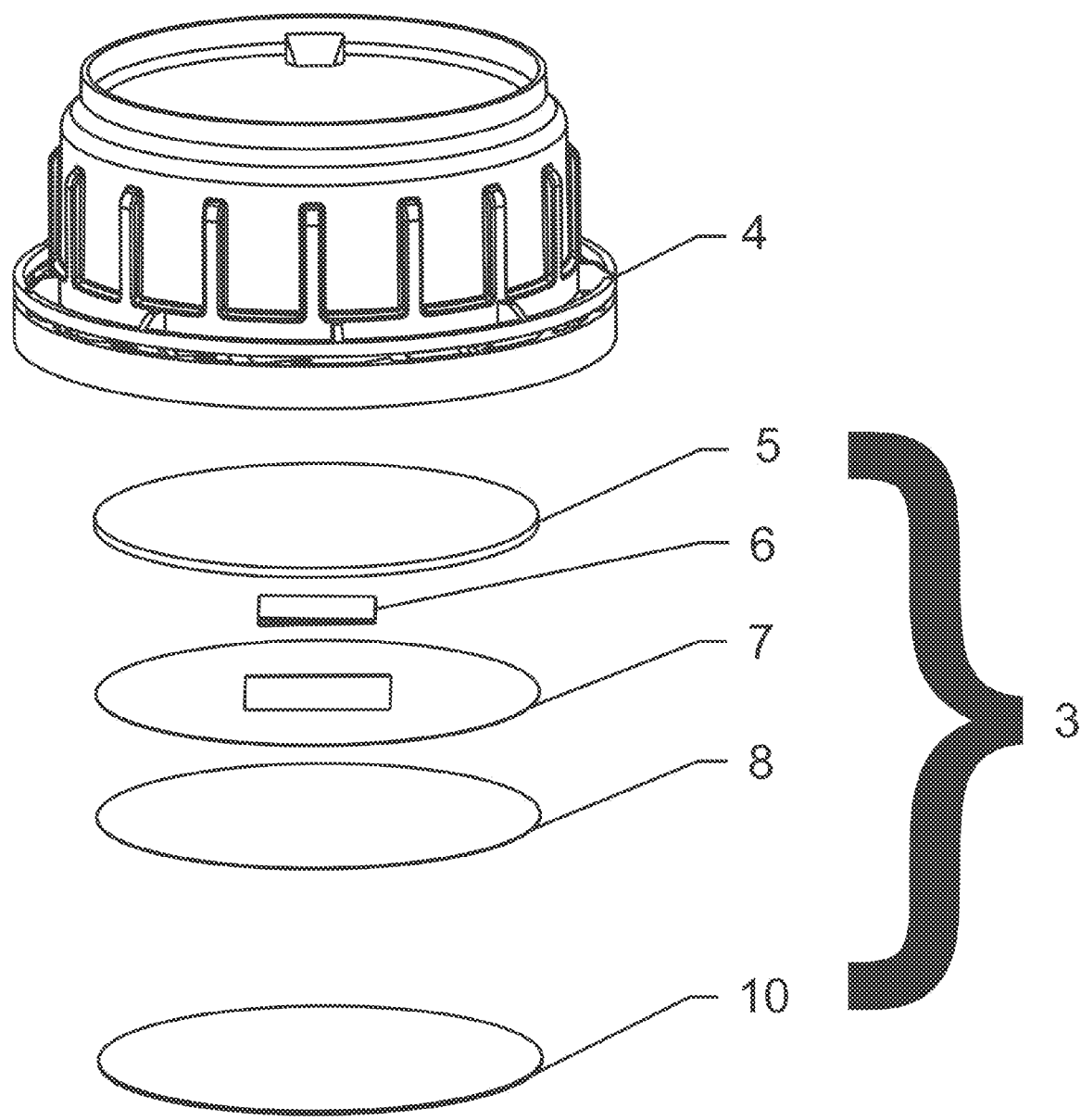

THE FIG. 5 illustrates an example of a closing set consisting of a cover (4) and a seal (3), which is mounted and/or attached to the inner portion of the cover (4i) by means of a fitting or other means of attachment, such as self-adhesive. The seal (3), in turn, is comprised of: a supporting disk (5), a label with frangible radiofrequency identification feature (6), where one of its ends is attached to the supporting disk (5) and the other to the metal foil (8), a wax layer (7), which temporarily attaches the metal foil (8) to the support disk (5) in the peripheral region to the label with frangible radiofrequency identification feature (6), a metal foil (8) and a sealable film (10), which promotes the permanent attachment of the seal (3) to the package nozzle (2) right after the sealing.

Figure 6:
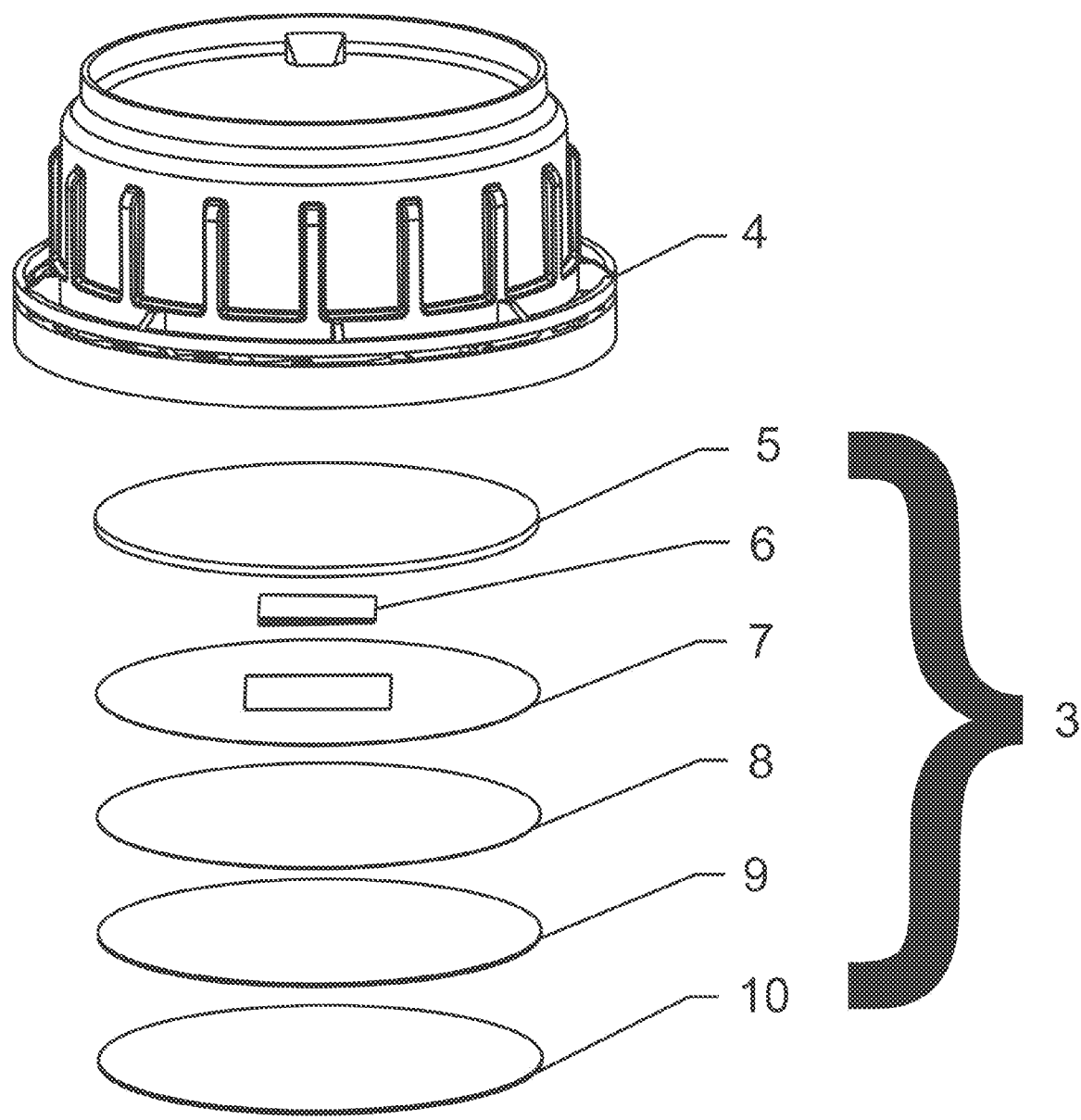

The FIG. 6 illustrates an example of a closing set consisting of a cover (4) and a seal (3), which is mounted and/or attached to the inner portion of the cover (4i) by means of a fitting or other means of attachment, such as adhesive. The seal (3), in turn, is comprised of: a supporting disk (5), a label with frangible radiofrequency identification feature (6), where one of its ends is attached to the supporting disk (5) and the other to the metal foil (8), a wax layer (7), which temporarily attaches the metal foil (8) to the support disk (5) in the peripheral region to the label with frangible radiofrequency identification feature (6), a metal foil (8), a barrier layer (9) and a sealable film (10), which promotes the permanent attachment of the seal (3) to the package nozzle (2) right after the sealing.

Figure 7:
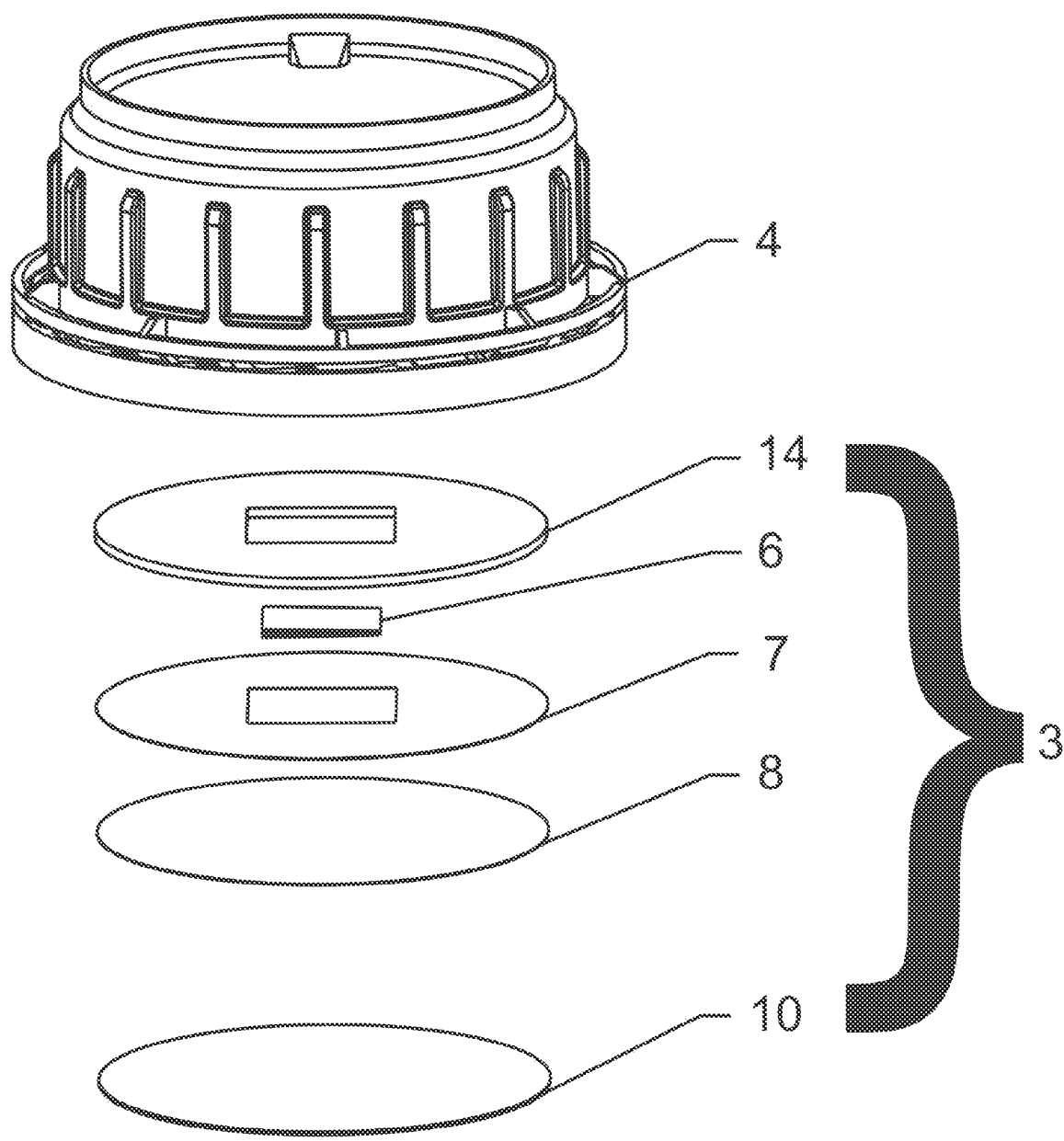

The FIG. 7 illustrates an example of a closing set consisting of a cover (4) and a seal (3), which is mounted and/or attached to the inner portion of the cover (4i) by means of a fitting or other means of attachment, such as self-adhesive. The seal (3), in turn, is comprised of: a supporting disc with passage (14), a label with frangible radiofrequency identification feature (6), where one of its ends is attached to the inner portion of the cover (4i) and the other to the metal foil (8), a wax layer (7), which temporarily attaches the metal foil (8) to the supporting disk with passage (14) in the peripheral region to the label with frangible radio frequency identification feature (6), a metal foil (8) and a sealable film (10), which promotes the permanent attachment of the seal (3) to the package nozzle (2) after the sealing.

Figure 8:
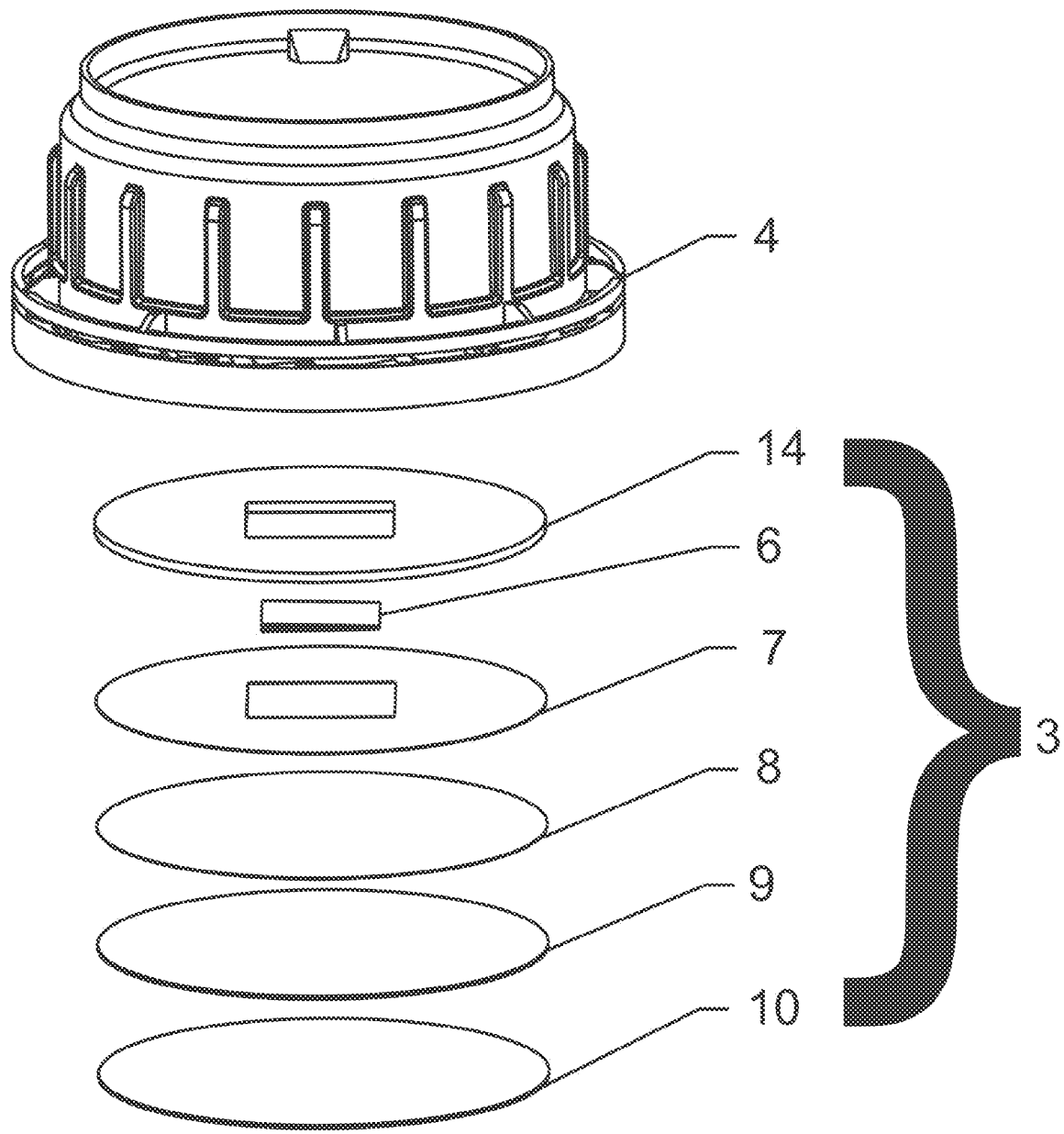

The FIG. 8 illustrates an example of a closing set consisting of a cover (4) and a seal (3), which is mounted and or attached to the inner portion of the cover (4i) by means of a fitting or other means of attachment, such as adhesive, for example. The seal (3), in turn, is comprised of: a supporting disk with passage (14), a label with frangible radiofrequency identification feature (6), where one of the ends is attached to the inner portion of the cover (4i) and the other to the metal foil (8), a wax layer (7), which temporarily attaches the metal foil (8) to the supporting disk with passage (14) in the peripheral region to the label with frangible radiofrequency identification feature (6), a metal foil (8), a barrier layer (9) and a sealable film (10), which promotes permanent attachment of the seal (3) to the package nozzle (2) right after the sealing.

Figure 9:
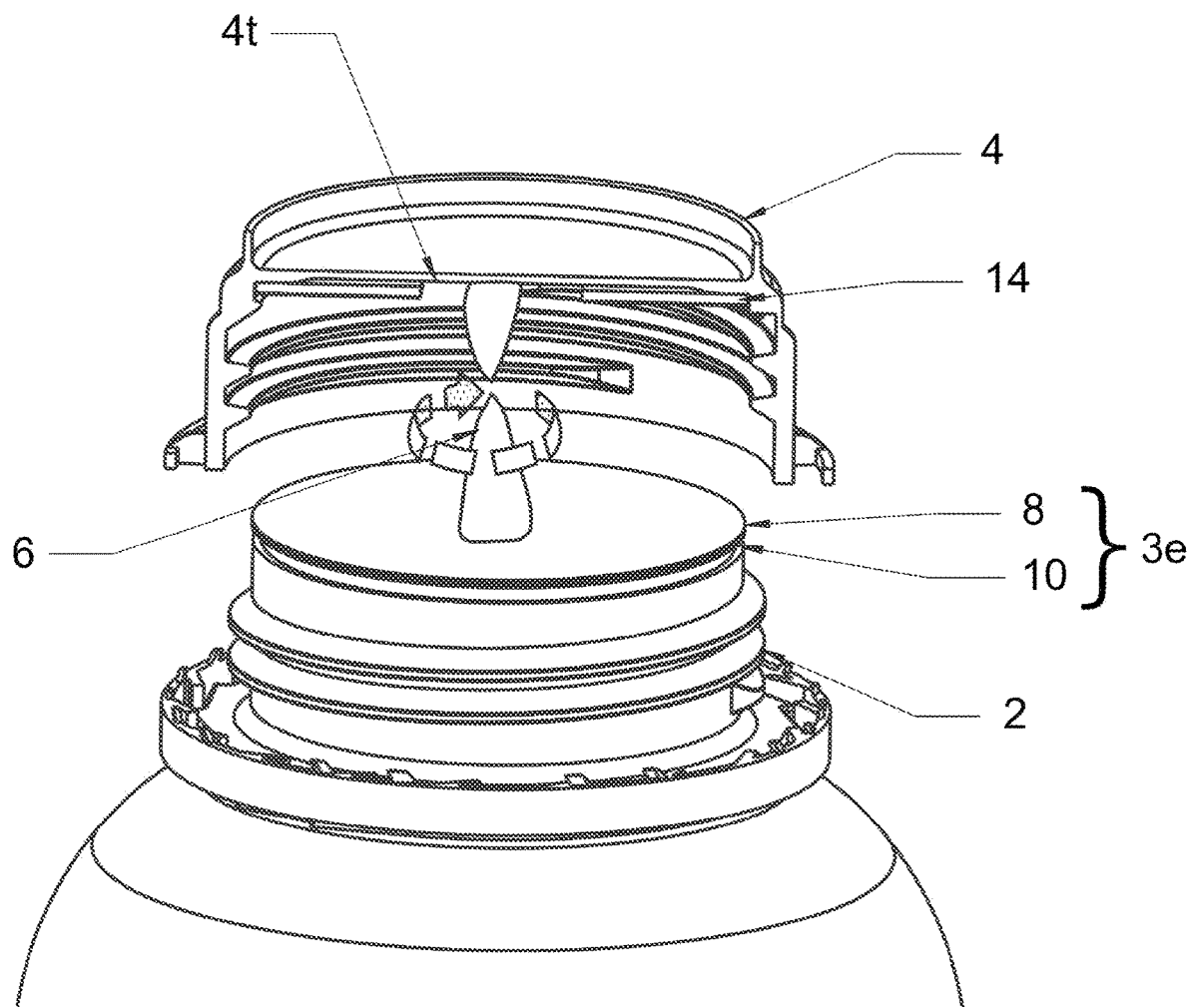

THE FIG. 9 illustrates the closing set after the sealing, during the opening of the cover (4), where part of the seal (3) is attached to the nozzle (2) in the body of the package (1) and the radiofrequency identification label (6) is attached to the top surface (4t) of the cover (4) and another end is attached to the outer portion of the seal (3e) attached to the nozzle (2), in this example the metal foil (8). The supporting disc with passage (14) is attached to the cover (4).

Figure 10:
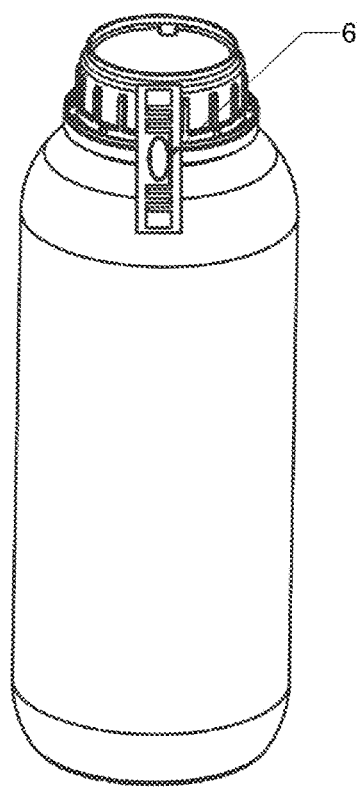
Figure 10:
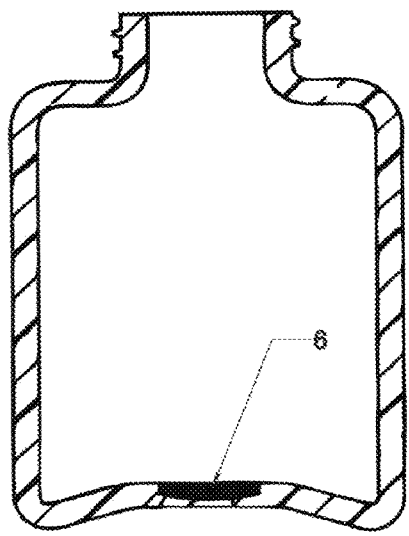
Figure 10:
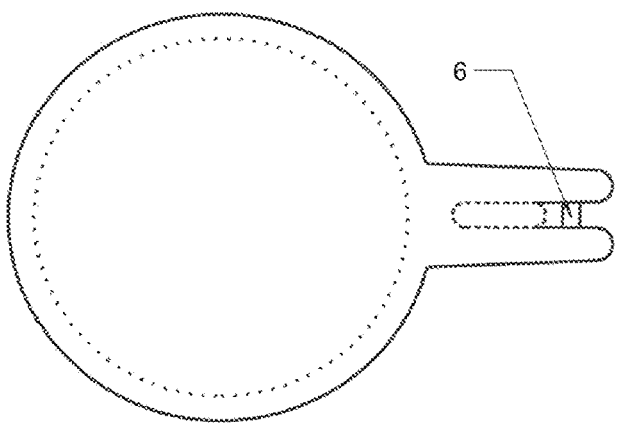

The FIG. 10 illustrates examples of closing set, seals and package with a radiofrequency identification feature known in the state of the art. The FIG. 10A illustrates a package that has a label with frangible radiofrequency identification feature (6) on the outside. The FIG. 10B illustrates a metallic seal with a side flap where a label with radiofrequency identification feature (6) is mounted, such as in the patent EP3184456 A1. The FIG. 10C illustrates a package where a label with radiofrequency identification feature (6) is attached to the bottom during the process, as for example in the patent PI0707510-3 A2.

DESCRIPTION OF INVENTION

According to a first main aspect, this invention consists of a package closing system comprising cover (4), seal (3) attached to the package nozzle (2) and a "frangible" type radiofrequency identification label (6), characterized by the "frangible" type radiofrequency identification label (6) to be attached directly or indirectly in one of its parts on the inner portion of the cover (4i) and on another part on the outer portion of the seal (3e), so that the opening of the cover (4) causes the destruction of the "frangible" type radiofrequency identification label (6).

According to a second main aspect, this invention consists in the use of such a package closing system in a package authentication system, which also comprises a device for reading (15) information from the frangible" type radiofrequency identification label (6) and a system for verifying the read information (16) in relation to a database (17).

According to this invention, a cover (4) means any movable or removable structure or device used to close and prevent unintentional passage, through an opening, nozzle or span of a package, container or flask, provided with elements of attachment to the package such as threads, locks or fittings.

Still according to this invention, a seal (3) is any multilayer structure which seals the package so that it is positioned between the cover (4) and the nozzle (2) of the package. In a possible construction, the seal has a sealable film (10) (of a material such as PEBD) which is fused by heating induced by a metal foil (8) present in the structure of the same seal (3), by applying an electromagnetic field, welding the seal (3) and sealing the nozzle (2) of the package. In another possible construction, the seal (3) has an adhesive that is repaired by the heating induced by a metal foil (8) present in the structure of the same seal (3), through the application of an electromagnetic field, setting the seal (3) and sealing the nozzle (2). In another possible construction, the seal (3) has a film that acts as a barrier against corrosion (9) (of a material such as PET) between the metal foil (8) and the sealable film (10). In another possible construction, the seal (3) has a supporting disk (5) (of a material, such as paperboard or expanded polyethylene) attached to the metal foil (8) (by means of an adhesive, such as a wax (7)), which guarantees contact of the entire nozzle area with the metal foil (8) and the means of attachment (such as the sealable film (10)) during the application of the electromagnetic field and thus a perfect sealing/sealing.

According to this invention, any process preventing movement of the seal (3) in relation to the nozzle (2) is to be understood as fixing the seal (3) to the nozzle (2). In a possible construction, this fixing of the seal (3) occurs through the fusion of a sealable film (10) by the heating induced by electromagnetic field in the metal foil (8) present in the structure of the seal (3).

Also according to this invention, a "frangible" type radiofrequency identification label (6) means any radiofrequency identification label which is destructible under application of external force. In a possible construction, the radiofrequency identification label (6) may be of the passive, semi-passive or active type, as a substrate (13) of a fragile material (such as PVC or paper) that disintegrates with the application of a force to remove it from a surface to which it is attached. In another possible construction, the frangible" type radiofrequency identification label (6), which can have operating frequency in LF, HF, UHF, etc, using the RFID, beacon, wi-fi or bluetooth technologies, for example, it can have in its substrate (13), regions of fragility, such as cuts or micro drillings, that concentrate the tensions in order to begin the destruction of the label in these points, when it is submitted to torsional, tensile or shear forces, for example. In another possible construction, the "frangible" radiofrequency identification label (6) incorporates in addition to a unique identifier and a manufacturer's identifier, information about the contents of the package, such as manufacturing date and expiry, batch number, instructions for use and disposal (such as an electronic package leaflet) or even the electronic address of a website on the World Wide Web to access information of this nature, for example.

According to this invention, parts of the "frangible" type radiofrequency identification label (6) means any portion of the substrate (13), antenna (12) and or microprocessor (11). In a possible construction, the ends of a rectangular shaped substrate (13), for example, are attached to the inner part of the cover (4i) and the metal foil (8) of the seal (3). In another possible construction, the end of the substrate (13) is fixed to the metal foil (8) of the seal (3) and the inner part of the cover (4i) is fixed to most of the antenna (12), for example.

Also according to this invention, the inner portion of the cover (4i) means the surface of the cover (4) protected from the external environment when is mounted on the package, formed by a side wall (4p) and a top surface (4t). In a possible construction, the frangible" type radiofrequency identification label (6) is attached directly to a point on the inner portion of the cover (4i), such as the top surface (4t).

According to this invention, the outer portion of the seal (3e) is defined as the layer of the seal which is attached to the nozzle (2) on the body (1) of the package during the process of permanent attachment of the seal (3) to the nozzle (2). In a possible construction, the frangible type radiofrequency identification label (6) is attached at one end to the outer portion of the seal (3e), as the example of FIG. 9 would be the metal foil (8), while the other end of the substrate is attached to the inner surface of the cover (4i), more specifically the top surface (4t).

According to this invention, is understood as directly fixing, the non-use of connecting elements between the inner portion of the cover (4i), frangible type radiofrequency identification label (6) and the outer portion of the seal (3e), as well as the means with exclusive attachment function (such as adhesives, induction welding of the label substrate to the seal or the application of fastening elements such as locks or fittings, for example). Also according to this invention, it is understood as indirectly fixing, the use of connecting elements (such as tape, cord, hook, lock) to fasten the frangible type radiofrequency identification label (6), either in the inner portion of the cover (4i) or in the outer portion of the seal (3e).

In a possible construction with indirect attachment on the cover (4), the frangible type radiofrequency identification label (6) is attached at one of its ends by means of an adhesive on a paperboard disk, which acts as a supporting disk (5) and connecting element and this paperboard disk, in turn, is attached on the inner portion of the cover (4i) through adhesive or fittings acting as a lock; while the other end of the frangible type radiofrequency identification label (6) is attached directly to the metal foil (8) of the seal (3), also through adhesive. In this example, the metal foil (8) is temporarily held together with the supporting disk (5) before the induction process, through a wax layer (7), which after heating generated by the induction process, melts and is absorbed by the supporting disk (5), detaching the metal foil (8) from the supporting disk (5) and keeping it connected to the supporting disk (5) only by means of the frangible type radiofrequency identification label (6), previously attached to the supporting disk (5) by means of permanent fixing, in this example, an adhesive. In another possible construction with indirect fixing, the frangible type radiofrequency identification label (6) is attached to one of its ends by means of an adhesive on a connecting element, such as a tape or cord, while the other end of the frangible type radiofrequency identification label (6) is attached directly to the metal foil (8) of the seal (3), which in this example is the outer portion of the seal (3e). This connecting element is attached to the inner portion of the cover (4i) and transmits the force applied to the opening of the cover (4), breaking the frangible type radiofrequency identification label (6). In another example, the frangible type radiofrequency identification label (6) is attached at one of its ends directly to the inner portion of the cover (4i) and at the other end is attached through a connecting element to the outer portion of the seal (3e).

In another possible construction with direct fixing to the cover (4), the frangible type radiofrequency identification label (6) is attached to one of its ends directly by means of adhesive to the inner portion of the cover (4i), while the other end of the radiofrequency identification label is attached directly to the metal foil (8) of the seal (3), also by means of adhesive. In this construction, the frangible type radiofrequency identification label (6) passes through a passage on the supporting disc with passage (14), which is also temporarily united with the metal foil (8) through wax (7).

In another possible construction, the frangible type radiofrequency identification label (6) is attached to one of its ends indirectly by means of an adhesive on a paperboard disk, which acts as a supporting disc (5) and this paperboard disk, in turn, is attached to the inner portion of the cover (4i) by means of adhesive or fittings acting as a lock; while the other end of the frangible type radiofrequency identification label (6) is attached directly to the metal foil (8) of the seal (3), by the process of induction and partial melting of the substrate (13) of the frangible type radiofrequency identification label.

According to this invention, opening of the cover (4) means partial or total removal by any disassembly mechanism and or opening. In a possible construction, the opening of the cover occurs by the rotation of the cover (4) in relation to the nozzle (2). In other possible construction, the opening is held by moving the cover (4) vertically in relation to the nozzle (2), for example.

According to this invention, is understood as destruction of the frangible type radiofrequency identification label (6) any damage preventing its normal operation, whether to the substrate (13), antenna (12) or microprocessor (11). In a possible construction, the destruction of the frangible type radiofrequency identification label (6) occurs by the shear caused by the rotation of the cover (4) on the substrate (13) and antenna (12) of the frangible type radiofrequency identification label (6), which are fixed between the outer portion of the seal (3e) and the inner portion of the cover (4i).

According to this invention, it's understood by means of fixing of the frangible type radiofrequency identification label (6) to the seal (3) in a totally or partially electromagnetically isolated manner, only part of the substrate (13) of the frangible type radiofrequency identification label (6) is attached to the metal foil (8) of the seal (3), the rest of the frangible type radiofrequency identification label (6) can be attached directly or indirectly to the cover (4), protected from contact with the metal foil (8) by an insulating material such as air, the supporting disc itself (14), part of the substrate (13) of the frangible type radio frequency identification label (6) or an insulating film for example. In a possible construction, ¼ of the length of the frangible type radiofrequency identification label (6) is attached with permanent adhesive on the metal foil (8), passing the ¾ of length of the label through an opening in the supporting disk with passage (14) that avoids the direct contact of ¾ of the label surface with the metal foil (8). In this construction, the ¾ of the length of the frangible type radiofrequency identification label (6) have a self-adhesive surface for attachment directly to the inner portion of the cover (4i). In another possible construction, the frangible type radiofrequency identification label (6) is folded in half and ½ of the label's length is attached to the metal foil (8), while the other ½ is attached by means of an adhesive to the supporting disk (5), with the very substrate (13) of the frangible type radiofrequency identification label (6) acting as an insulating medium.

According to the present invention, metal foil (8) is the layer of a metallic seal material (3), capable of acting as a physical and chemical barrier, but mainly, capable of generating heat when submitted to an electromagnetic field, for the purpose of fixing the seal (3) and sealing the package. In a possible construction, the metal foil (8) is an aluminum disk, acting as a barrier against moisture and oxygen, which, when submitted to an electromagnetic field, melts a sealable film (10), welding the metal foil (8) to the package nozzle (2).

According to this invention, an electromagnetic field is a physical field produced by electrically charged objects. In a possible construction, an alternating electromagnetic field is generated in an inductor coil and when the seal (3) containing a metal foil (8) passes through this field, eddy currents are induced and circulate against the electrical resistance of the metal foil (8), generating heat. The heat generated melts the foil of the sealable film (10), which is situated between the metal foil (8) and the nozzle (2), as well as the portion of the substrate (13) of the frangible type radiofrequency identification label (6) in contact with the metal foil (8) in the outer portion of the seal (3e).

According to this invention, a barrier layer (9) is a layer added to the laminar structure of the seal (3) in order to prevent or hinder the transmission (passage/permeation) of substances such as gases and vapors. In a possible construction, a barrier layer (9) of a polymer such as PET, for example, is added to the seal structure (3) between the metal foil (8) and the sealable film (10) to prevent the vapor permeation of the product contained in the package from permeating the sealable film (10) and chemically attacking the metal foil (8), for example.

According to this invention, a radiofrequency reading device (15) is understood as a radiofrequency interface comprising an antenna, a device with processing capability and interfaces. The high frequency interface generates power to activate and provides power for the radiofrequency identification label, sends data to the label, and receives data from the label. The radiofrequency reading device has one or more antennas that emit radio waves and receive signals transmitted from the radiofrequency identification label. The processing capability device is based on a microprocessor to control communication with the label. It also codifies and decodes the signal received from the radiofrequency identification label. In a possible construction, this radiofrequency reading device (15) is a specific reader for reading passive UHF-type RFID tags. In another possible construction, this radiofrequency reading device is a smartphone type mobile phone, with a NFC (Near Field Communication) or HF type reader, for example. In another possible construction, the radiofrequency reading device is an external device connectable to a portable interface, such as a smartphone-type of mobile phone or tablet.

According to this invention, system for verifying the information read (16) is a set of instructions describing a task to be performed by a computer. A possible configuration is a computer program in the form of an app running on a smartphone type of mobile phone, for example. This app would look for the information read (such as the unique identifier of that label) from the radiofrequency reading device (15) on the frangible type radiofrequency identification label (6) in a database (17) contained in the cloud via wi-fi, for example. In case of confirmation of the unique identifier of the frangible type radiofrequency identification label (6) in the database (17), the system (16) would return a positive indication on the inviolability/authenticity of the package. Otherwise, if there is no reading (by the lack of the frangible type radiofrequency identification label (6) or its self destruction) or the unique identifier of the frangible type radiofrequency identification label (6) is not in the database (17), the system (16) would indicate the violation and the potential non-authenticity of the package, for example.

According to this invention, is called database (17) a collection of interrelated data representing information on a specific field. In a possible configuration, this domain is the unique identifiers of each radiofrequency identification label of packages packaged in a certain batch and plant. In another possible configuration, they also comprise subgroups of unique identifiers radiofrequency identification label for stolen shipments or defective batches, for example.

The invention claimed is:

1. A radiofrequency (RF) authentication packaging closure system comprising a cover having an inner portion configured for a screw connection to a package nozzle, a metallic induction seal connected to package nozzle, and a frangible radio frequency identification label, wherein one portion of the frangible radio frequency identification label is attached to the inner portion of the cover and another portion of the frangible radiofrequency identification label is attached to the metallic induction seal in a totally or partially electromagnetically isolated manner, such that unscrewing the cover from the package nozzle damages the frangible radiofrequency identification label and prevents its operation.

2. The radiofrequency (RF) authentication packaging closure according to claim 1, wherein the frangible radiofrequency identification label is configured to be attached to the metallic induction seal after the cover is screwed to the packaging nozzle.

3. The radiofrequency (RF) authentication packaging closure system according to claim 2, wherein the frangible radiofrequency identification label is configured to be attached to the metallic induction seal by application of an electromagnetic field.

4. The radiofrequency (RF) authentication packaging closure system according to claim 1, wherein the metallic induction seal is configured to be temporarily fixed to the cover prior to attachment of the cover to the package nozzle, so that the frangible radiofrequency identification label is not destroyed when the cover is screwed to the packaging nozzle.

5. The radiofrequency (RF) authentication packaging closure system according to claim 1, wherein the one portion of the frangible radiofrequency identification label is indirectly attached to the inner portion of the cover by means of a supporting disk while the another portion of the frangible radiofrequency identification label is attached to a metal foil of the metallic induction seal and the metal foil is temporarily fixed to the supporting disk by a wax layer, and wherein the metallic induction seal also comprises a barrier layer connected to the metal foil and a sealable film connected to the barrier layer.

* * * * *